(12) United States Patent
Overend et al.

(10) Patent No.: US 10,633,494 B2
(45) Date of Patent: Apr. 28, 2020

(54) POLYMERIC MATERIALS

(71) Applicant: COLORMATRIX HOLDING, INC., Wilmington, DE (US)

(72) Inventors: Andrew Overend, Knowsley (GB); Patrick Brown, Knowsley (GB); Neil Davies, Knowsley (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 282 days.

(21) Appl. No.: 15/507,869

(22) PCT Filed: Aug. 27, 2015

(86) PCT No.: PCT/GB2015/052490
§ 371 (c)(1),
(2) Date: Mar. 1, 2017

(87) PCT Pub. No.: WO2016/034863
PCT Pub. Date: Mar. 10, 2016

(65) Prior Publication Data
US 2017/0283563 A1    Oct. 5, 2017

(30) Foreign Application Priority Data
Sep. 2, 2014 (GB) .................... 1415528.7

(51) Int. Cl.
| | |
|---|---|
| C08J 3/22 | (2006.01) |
| C09C 3/12 | (2006.01) |
| B29C 49/06 | (2006.01) |
| B01J 13/00 | (2006.01) |
| B29C 45/00 | (2006.01) |

(Continued)

(52) U.S. Cl.
CPC ........... *C08J 3/226* (2013.01); *B01J 13/0039* (2013.01); *B29C 45/0013* (2013.01); *B29C 49/06* (2013.01); *C08L 83/04* (2013.01); *C09C 3/12* (2013.01); *B29B 2911/00* (2013.01); *B29C 2045/0015* (2013.01); *C08J 2300/22* (2013.01);

(Continued)

(58) Field of Classification Search
None
See application file for complete search history.

(56) References Cited

U.S. PATENT DOCUMENTS

| | | |
|---|---|---|
| 3,849,152 A | 11/1974 | Mimeault |
| 4,921,670 A | 5/1990 | Dallmann et al. |

(Continued)

FOREIGN PATENT DOCUMENTS

| | | |
|---|---|---|
| CN | 102002217 A | 4/2011 |
| CN | 102070820 A | 5/2011 |

(Continued)

Primary Examiner — Monica A Huson
(74) Attorney, Agent, or Firm — Fay Sharpe LLP

(57) ABSTRACT

A method of producing a product, for example a stretch blow moulded container having a metallic or pearlescent appearance, comprises selecting a mass, for example a container preform, comprising a thermoplastic polymer which incorporates a carrier polymer and stretching the thermoplastic polymer during production of said product, for example from said mass. Said carrier polymer is suitably polydimethylsiloxane and the mass may be made in a process which comprises contacting a thermoplastic polymer with a liquid formulation comprising carrier polymer and colourant.

18 Claims, 1 Drawing Sheet

Figure 1:
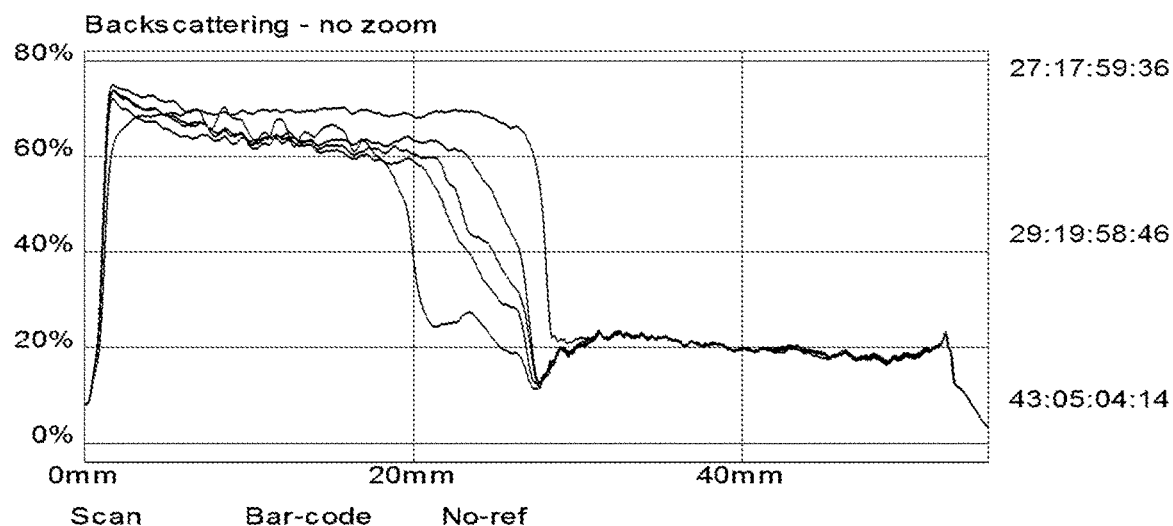

(51) Int. Cl.
*C08L 83/04* (2006.01)
*C08L 67/00* (2006.01)

(52) U.S. Cl.
CPC ........ *C08J 2367/00* (2013.01); *C08J 2483/04* (2013.01); *C08L 67/00* (2013.01)

(56) References Cited

U.S. PATENT DOCUMENTS

| | | |
|---|---|---|
| 5,889,090 A | 3/1999 | Tooley et al. |
| 6,080,489 A | 6/2000 | Mehta |
| 8,535,770 B2 | 9/2013 | Wang et al. |
| 8,753,443 B1 | 6/2014 | Keuk et al. |
| 8,859,067 B2 | 10/2014 | Wang et al. |
| 9,676,135 B2 | 6/2017 | Wang et al. |
| 2005/0101757 A1* | 5/2005 | Glasgow ................ C08L 69/00 528/196 |
| 2007/0078201 A1 | 4/2007 | Sawada et al. |

FOREIGN PATENT DOCUMENTS

| | | |
|---|---|---|
| CN | 103013061 A | 4/2013 |
| CN | 103709584 A | 4/2014 |
| CN | 104479273 A | 4/2015 |
| EP | 0 718 370 A1 | 6/1996 |
| EP | 1 052 269 A1 | 11/2000 |
| EP | 2 113 522 A1 | 11/2009 |
| GB | 1 218 503 A | 1/1971 |
| JP | 58-69233 A | 4/1983 |
| JP | 1-121329 A | 5/1989 |
| JP | 6-145490 A | 5/1994 |
| WO | 2005/097872 A1 | 10/2005 |

* cited by examiner

POLYMERIC MATERIALS

This application is the U.S. National Phase application under 35 U.S.C. § 371 of International Application No. PCT/GB2015/052490, filed Aug. 27, 2015, published as WO 2016/034863 on Mar. 10, 2016, which claims the benefit of GB Patent Application Number 1415528.7 filed Sep. 2, 2014. These applications are hereby incorporated by reference herein.

This invention relates to polymeric materials and particularly, although not exclusively, relates to the production of a metallic or pearlescent appearance in thermoplastic polymers. Preferred embodiments relate to a formulation for addition to a thermoplastic polymer to produce the appearance, and a method of producing a product, for example a plastics (e.g. PET) bottle.

In a range of plastics products, for example plastics bottles, it is desirable to be able to produce a metallic or pearlescent effect. It is known to achieve this effect by use of metallic or pearlescent pigments (referred to as "effect materials") which are dispersed within the polymeric material which is used to produce the plastics product. The effect materials may be introduced into the polymeric material using a masterbatch in which one or more effect materials are dispersed. However, preparation of masterbatches (or other formulations for delivering the effect materials) risks damaging the effect materials leading to diminution of the effectiveness of the effect materials and/or the need to increase the loading of effect materials in the polymeric material. In addition, the use of effect materials can cause screw-slip during their incorporation into the polymeric material using an extruder or injection moulder. Furthermore, effect materials can result in specking, wherein regions of undispersed pigment are visible in a product.

The intensity of a metallic or pearlescent effect depends on how well the platelets of effect materials align parallel to the surface of a plastic product. In injection moulding, orientation can be disturbed by drag when platelets pass through gates. This can be problematic since it may lead to formulation of dark flow lines which are aesthetically undesirable.

It is an object of preferred embodiments of the present invention to address at least some of the above described problems.

According to a first aspect, there is provided a formulation for addition to a thermoplastic polymeric material, said formulation comprising:

(i) a carrier polymer which includes oxygen atoms and silicon atoms in its backbone; and (ii) a colourant;

wherein said formulation is a liquid.

Unless otherwise stated herein, references to a state of a material herein (e.g. liquid) refer to the state at standard ambient temperature and pressure (SATP)—i.e. 25° C. and 100 kPa (absolute pressure).

Said formulation is preferably pumpable at 23° C. so it can be delivered into a process described herein.

Said formulation is preferable a liquid at 23° C. and a shear rate of 1 s$^{-1}$.

Preferably, said formulation has a viscosity of between 100,000 cP and 1,000 cP, more preferably between 50,000 cP and 2,000 cP and most preferably between 4,000 and 30,000 cP as measured using a Brookfield viscometer using spindle number 7 at room temperature (e.g. 22° C.) at a torque value of ~50%. The formulation is suitably stable to sedimentation of any solid particulates that may be present.

Said carrier polymer is preferably a polyorganosiloxane, for example a polydialkylsiloxane.

Preferably, said carrier polymer includes a repeat unit of formula

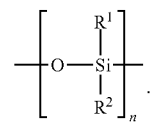

wherein $R^1$ and $R^2$ independently are selected from: optionally-substituted, saturated or unsaturated, alkyl moieties, aryl moieties, alkylaryl moieties and arylalkyl moieties. Preferably, $R^1$ and $R^2$ are independently selected from: saturated or unsaturated alkyl moieties having 1 to 6 carbon atoms and aryl moieties, alkylaryl moieties and arylalkyl moieties having 6 to 12 carbon atoms.

More preferably, $R^1$ and $R^2$ are independently selected from optionally-substituted (preferably un-substituted) $C_{1-4}$ saturated alkyl moieties.

$R^1$ and $R^2$ preferably represent the same moiety.

$R^1$ and $R^2$ both preferably represent $C_{1-2}$ un-substituted alkyl moieties and, more preferably, both are methyl groups.

Preferably, n in Formula I represents the average number of repeat units in said carrier polymer. Preferably, n is in the range 30-1200.

Said carrier polymer may be a random or block copolymer which includes a repeat unit of formula I.

Preferably, at least 75 wt % (especially at least 90 wt %) of the total weight of said carrier polymer is made up of repeat units of Formula I.

Preferably, at least 80 wt % (especially at least 95 wt %) of the total weight of the repeat units of said carrier polymer are made up of repeat units of Formula I.

Preferably, at least 75 wt % (especially at least 90 wt %) of the total weight of said carrier polymer is made up of repeat units of Formula I, wherein $R^1$ and $R^2$ represent unsubstituted methyl groups.

Preferably, at least 80 wt % (especially at least 95 wt %) of the total weight of the repeat units of said carrier polymer are made up of repeat units of Formula I, wherein $R^1$ and $R^2$ represent unsubstituted methyl groups.

Preferably, the only repeat unit in said carrier polymer is of Formula I and, especially, is of Formula

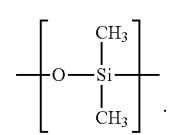

Preferably, said carrier polymer includes silicon, carbon, hydrogen and oxygen atoms only.

Preferably, in said carrier polymer, the ratio defined as the number of oxygen atoms divided by the number of silicon atoms is 1 or less. It is preferably greater than 0.9.

Preferably, in said carrier polymer, the ratio defined as the number of hydrogen atoms divided by the number of carbon atoms is in the range 2 to 3 and, especially, is 3.

Preferably, said carrier polymer is a liquid at SATP.

Said carrier polymer may have a viscosity of at least 20 cP, preferably at least 500 cP, more preferably at least 1000 cP. The aforementioned viscosities may be measured using a Brookfield viscometer using spindle number 7 at room temperature (e.g. 22° C.) at a torque value of ~50%. The viscosity may be less than 60000 cP. The viscosity may be in the range 1000 cP to 50,000 cP, preferable in the range 1,000 cP to 40,000 cP.

Said carrier polymer may have a density at 25° C. of at least 950 kgm$^{-3}$; and preferably said density is less than 1000 kgm$^{-3}$.

Said carrier polymer may have a pour point of at least −80° C., for example at least −60° C.; and preferably the pour point is less than 0° C., especially less than −20° C.

Said colourant may be dispersed or dissolved in the carrier polymer.

Said colourant may be selected from a pigment or dye. Said colourant may be selected from colourants disclosed in the Colour Index International Handbook. A pigment may be organic or inorganic. A dye may be selected from acridine dyes, anthraquinone dyes, arylmethane dyes, diarylmethane dyes, triarylmethane dyes, azo dyes, diazonium dyes, nitro dyes, nitroso dyes, phthalocyanine dyes, quinone-imine dyes, azin dyes, eurhodin dyes, safranin dyes, indamine dyes, indophenol dyes, oxazin dyes, oxazone dyes, thiazine dyes, thiazole dyes, xanthene dyes, fluorene dyes, pyronin dyes and fluorone dyes. In one embodiment, said dye may be selected from an anthraquinone, a polymethine, a pyrazolone, a perinone and a quinophthalone. Said colourant may be selected from Solvent Blue 59, Solvent Blue 97, Solvent Green 28, Solvent Green 3, Disperse Orange 47, Solvent Orange 60, Solvent Red 135, Solvent Red 179, Solvent Red 195, Disperse Violet 26, Solvent Violet 13, Solvent Violet 36, Solvent Yellow 93, Solvent Yellow 114, Disperse Yellow 241, Pigment Violet 23, Solvent Blue 104, Pigment Yellow 147 and Pigment Violet 23.

Said formulation may include a plurality of colourants, for example a plurality of dyes, a dye and a pigment or a plurality of pigments.

An effect similar to the effect described herein may be achieved using "effect materials" as described in the introduction of the present specification. An effect material may be any material which, itself, provides additional colour effects such as angular dependence (e.g. iridescence, colour travel or lustre) or texture when incorporated into a thermoplastic polymeric material. For example, an effect material preferably provides a lustrous effect when incorporated. Such an effect material may comprise a laminar or plate-like material, for example a laminar or plate-like pigment. Effect materials may be selected to provide a pearly or nacreous lustre or a granite, marble, holography or glitter-like effect. An effect material may be selected from metallic oxide coated mica pigments (e.g. pearlescents), aluminium flake pigments, iron flake, stainless steel flake pigments, gold bronze pigments and zinc pigments.

In some cases, aluminium flake pigments may be included in said formulation as an opacifier. Thus, said formulation may include 0 to 5 wt % of aluminium flake pigments. Preferably, said formulation includes less than 2 wt % or, especially, 0 wt % of aluminium flake pigments.

The total amount of effect pigment in said formulation other than aluminium flake pigments is preferably less than 2 wt %, more preferably less than 1 wt % and, especially, 0 wt %.

In one embodiment, said formulation may include 2 wt % or less, 1 wt % or less, or, especially, substantially 0 wt % of an effect material as described.

In one embodiment, said formulation may include 2 wt % or less, 1 wt % or less or, especially, substantially 0 wt % of laminar or plate-like pigments.

In one embodiment, said formulation may include 2 wt % or less, 1 wt % or less or, especially, substantially 0 wt % of metallic colourant.

Preferably, said formulation includes 2 wt % or less, 1 wt % or less or, especially, substantially 0 wt % of pearlescent colourant.

At least 95 wt %, preferably about 100 wt %, of colourant(s) in said formulation have a maximum dimension which is less than 200 μm, especially less than 150 μm. Preferably no component of said formulation has a maximum dimension which is more than 200 μm.

Said formulation could include one or more carrier polymers each of which independently has features of said carrier polymer. In said formulation, the sum of the wt % of all carrier polymers which have features of said carrier polymer described, is suitably at least 50 wt %, preferably at least 75 wt %, more preferably at least 90 wt %, especially at least 95 wt % of the weight of said formulation.

Said formulation preferably includes at least 50 wt %, preferably at least 75 wt %, more preferably at least 90 wt %, especially at least 95 wt % of a carrier polymer as described.

Said formulation preferably includes at least 50 wt %, preferably at least 75 wt %, more preferably at least 90 wt %, especially at least 95 wt % of a polyorganosiloxane as the carrier polymer.

Said formulation preferably includes at least 50 wt %, preferably at least 75 wt %, more preferably at least 90 wt %, especially at least 95 wt % of a polydialkysiloxane.

Said formulation preferably includes at least 50 wt %, preferably at least 75 wt %, more preferably at least 90 wt %, especially at least 95 wt % of a polydimethylsiloxane.

Said formulation preferably includes at least 50 wt %, preferably at least 75 wt %, more preferably at least 90 wt %, especially at least 95 wt % of a single type of polydimethylsiloxane.

Said formulation preferably includes only one carrier polymer.

Said formulation may include 0.05 wt %, suitably at least 0.1 wt %, preferably at least 0.5 wt %, especially at least 1 wt %, of said colourant. The level of colourant depends on the colour desired for the final product. For example, if the final product (into which the formulation is dosed as described hereinafter) is to be black, said formulation may include up to 50 wt % of total colourants. Said formulation preferably includes 0.05 to 50 wt %, 0.5 to 20 wt % or 1 to 15 wt % of said colourant When said formulation includes more than one colourant of the type described herein, the sum of the wt % of colourants of the type described herein may be at least 0.10 wt % and less than 50 wt %. This sum may suitably be in the range 1 to 25 wt % or 1 to 20 wt % or 1 to 10 wt %.

In a preferred embodiment, said formulation comprises 50 to 99.95 wt % (more preferably 80 to 99 wt %, especially 85 to 99 wt %) of one or more (preferably only one type of) polydialkylsiloxane (especially polydimethylsiloxane) and 0.05 to 50 wt % (more preferably 1 to 20 wt %, especially 1 to 15 wt %) in total of one or more colourants. Said one or more colourants is preferably not an effect material as described.

Said formulation may include polydialkylsiloxane block and or graft copolymers where the other polymeric block is selected from polyether and polyesters at a level of 49 wt % or less, preferably 30 wt % of less, most preferably 20 wt % or less. Examples of polysiloxane polyether block/graft copolymers are those supplied by Dow Corning. Examples of polysiloxane polyester block/graft copolymers include those supplied by BYK Chemie.

Said formulation may include other additives suitably at a level of 5 wt % or less. Such additives may be selected from acetaldehyde scavengers, anti-oxidants, stabilizers and impact modifiers.

In one embodiment, said formulation may include a surface active agent. Said formulation may include a surfactant which is arranged to improve the stability of the formulation and/or restrict sedimentation of the colourant, for example when the colourant is not solubilised in the carrier polymer. Said surfactant is preferably a liquid. Said surfactant preferably includes oxygen atoms, silicon atoms and an alkyl or alkenyl moiety (preferably an alkyl moiety) which suitably has at least 5, preferably at least 10, more preferably at least 13 carbon atoms. Said surfactant may be a dimethicone which suitably incorporates an alkyl moiety as described. Said surfactant may be an alkyldimenthicone, preferably a dimethicone which incorporates a $C_{5-25}$ alkyl moiety, preferably a $C_{10-25}$ alky moiety, more preferably a $C_{15-20}$ alkyl moiety.

Said formulation may include less than 1 wt % of said surfactant, for example less than 0.8 wt %. In one embodiment, said formulation includes 75 to 97.9 wt % of said carrier polymer, 0.1 to 1 wt % of said surfactant and 2 to 24 wt % of one or more colourants.

Said formulation may include a rheology modifier which may be a silica, for example, fumed silica. In one embodiment, said formulation may include 75 to 97.8 wt % of said carrier polymer, 0.1 to 1 wt % of said surfactant, 2 to 24 wt % of one or more colourants and 0.1 to 1 wt % of one or more rheology modifiers.

Suitably, in said formulation, the sum of the wt % of all carrier polymers of the type described and all colourants is at least 90 wt %, preferably at least 95 wt %, more preferably at least 98 wt %. Preferably, in said formulation, the sum of the wt % of polydimethylsiloxane and all colourants is at least 95 wt %, more preferably at least 98 wt %.

According to a second aspect of the invention, there is provided a method of producing a product, the method comprising:

(i) selecting a mass comprising a thermoplastic polymer which incorporates a carrier polymer, wherein said carrier polymer includes oxygen atoms and silicon atoms in its backbone; and (ii) stretching the thermoplastic polymer during production of said product, for example from said mass.

Said carrier polymer of the second aspect may have any feature of the carrier polymer of the first aspect. Said carrier polymer is preferably a liquid at SATP. Said carrier polymer is preferably polydimethylsiloxane.

Said method may include a step (i)* which comprises contacting said carrier polymer with said thermoplastic polymer, suitably prior to step (i). In this case, said carrier polymer is preferably part of a formulation. Said formulation of the second aspect may include a colourant. Said formulation of the second aspect may include any feature of the formulation of the first aspect. In the method, in step (i)*, preferably said formulation is contacted with said thermoplastic polymer.

Step (i)* of the method may take place in a melt-processing apparatus. The carrier polymer is preferably dosed into said thermoplastic polymer when said thermoplastic polymer is in a molten state. Said thermoplastic polymer may be melted in an extruder and said carrier polymer may be contacted with the thermoplastic polymer in said extruder or downstream thereof. Said carrier polymer is preferably injected at relatively high pressure (5-120 bar) into the thermoplastic polymer. A mixing means is suitably provided for facilitating mixing of the carrier polymer and thermoplastic polymer.

In step (i)*, preferably a mixture is formed comprising carrier polymer and thermoplastic polymer. The mass selected in step (i) may include said mixture. Said mass may include at least 0.5 wt %, preferably at least 1 wt %, for example 1 to 5 wt % of carrier polymer; and at least 95 wt % for example 95 to 99.5 wt % of thermoplastic polymer. Said mass may include 0 to 2 wt %, for example at least 0.025 wt % of colourant(s). Said mass may include 0.025 wt % to 1.5 wt % of colourant(s).

In said mass, the ratio of the wt % of carrier polymer divided by thermoplastic polymers may be in the range 0.05 to 0.005.

Said thermoplastic polymer is preferably not compatible with the carrier polymer so that, in a mixture comprising carrier polymer and thermoplastic polymer, a mixture comprising at least two phases is formed—i.e. one phase comprising the thermoplastic polymer and a second phase, dispersed in the thermoplastic polymer, comprising the carrier polymer.

Said thermoplastic polymer may be selected from polyesters, polyolefins, polycarbonates, acrylics, polyamides and polystyrenes. Said thermoplastic polymer is preferably a polyester, especially polyethylene terephthalate.

Step (ii) of the method may be undertaken whilst the thermoplastic polymer is at ambient temperature (e.g. where the thermoplastic polymer is cold drawn) or where the thermoplastic polymer is at an elevated temperature (e.g. above the Tg of the thermoplastic polymer but suitably less than the melting temperature of the thermoplastic polymer).

In one embodiment, a precursor of the product may be made and isolated prior to step (ii) of the method. Said mass selected in step (i) may be in the form of said precursor. For example, after contact in step (i)*, a mixture comprising carrier polymer and thermoplastic polymer may be melt-processed to produce a precursor which is cooled to produce a solid form. The precursor may be cooled to ambient temperature and, suitably, the precursor is held at ambient temperature until it is subsequently subjected to step (ii) of the method. As an example of the aforesaid, the precursor may be a preform for a bottle. The preform may be made in the method and stored at ambient temperature until step (ii).

In another embodiment, step (ii) may be undertaken whilst a mixture comprising carrier polymer and thermoplastic polymer is still relatively hot (e.g. above ambient temperature) such as immediately after a precursor of the product is formed in a melt-processing process. For example, after contact in step (i)*, a mixture comprising carrier polymer and thermoplastic polymer may be extruded or spun and step (ii) undertaken before the extruded or spun mixture has cooled to ambient temperature.

Step (ii) preferably comprises stretching the thermoplastic polymer in at least one direction (i.e. uniaxial stretching); this could be in fibre or film formation. Step (ii) may comprise stretching the thermoplastic polymer in at least two directions (i.e. biaxial stretching); this could be in fibre, sheet, film or container formation.

The method of the second aspect preferably comprises production of a bottle (e.g. a polyester bottle) from a preform by contacting thermoplastic polymer (e.g. polyester) with a carrier polymer (e.g. PDMS), as described in the first aspect; injection moulding a mixture comprising the thermoplastic polymer and carrier polymer to produce a preform; and subsequently stretch blow moulding the preform to produce a product in the form of a bottle.

According to a third aspect of the invention, there is provided a product which comprises a stretched thermoplastic polymer (e.g. produced in a method of the second aspect), wherein said product includes said thermoplastic polymer and a carrier polymer which includes oxygen atoms and silicon atoms in its backbone.

Said carrier polymer of the third aspect may have any feature of the carrier polymer of the first aspect. Said carrier polymer is preferably polydimethylsiloxane.

Said thermoplastic polymer preferably includes a colourant. The colourant may be as described according to the first aspect.

Said product preferably incorporates a formulation as described according to the first aspect.

Said product may include 0.5 to 5 wt % of carrier polymer and 95 to 99.5 wt % of thermoplastic polymer. Preferably, the product includes 0.025 to 1.5 wt % of colourant(s).

Said product may be uniaxially or biaxially stretched. Said product is preferably biaxially stretched.

Said product may be selected from a fibre, film, sheet or container, for example a stretch blow-moulded container. Said product is preferably a container as aforesaid.

According to a fourth aspect, there is provided a precursor of a product according to the third aspect, the precursor comprising a thermoplastic polymer and, dispersed within the thermoplastic polymer, a carrier polymer which includes oxygen atoms and silicon atoms in its backbone.

Said preform may include 0.5 to 5 wt % of carrier polymer and 95 to 99.5 wt % of thermoplastic polymer. Preferably, the product includes 0.025 to 1.5 wt % of colourant(s).

Said precursor is preferably a preform for a stretched blow-moulded container.

Any invention described herein may be combined with any feature of any other invention or embodiment described herein mutatis mutandis.

Figure 2:
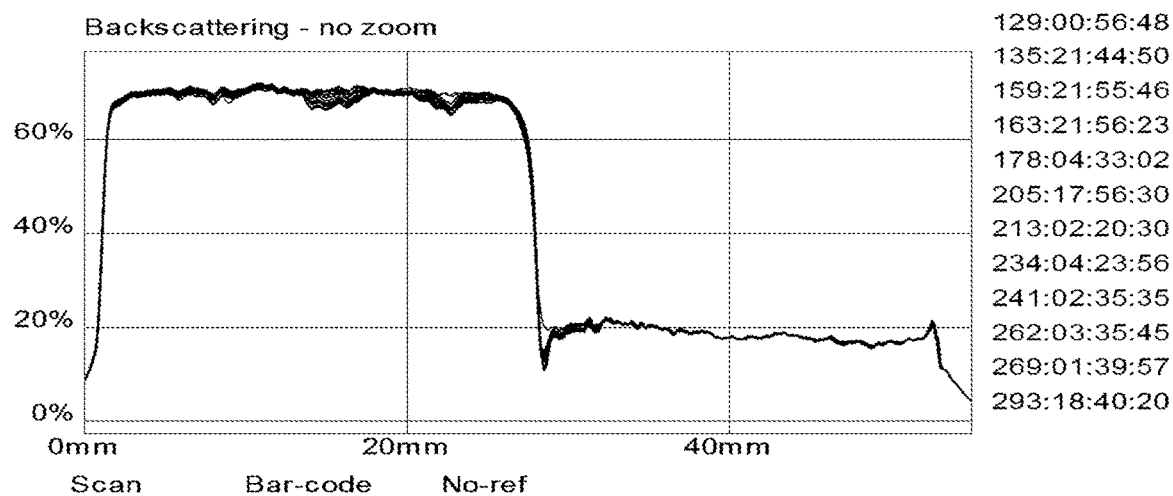

Specific embodiments of the invention will now be described by way of example, with reference to the accompanying figures, wherein:

FIG. 1 provides results of a Turbiscan assessment of the Example 20 formulation;

FIG. 2 provides results of a Turbiscan assessment of the Example 21 formulation.

The following materials are referred to hereinafter:

PDMS-1—refers to polydimethylsiloxane having a viscosity at 25° C. of 12,500 centistokes a viscosity temperature coefficient of 0.60, a specific gravity at 25° C. of 0.975, a refractive index at 25° C. of 1.4035, a pour point of −46° C., a flash point of 321° C. and a surface tension of 21.3 dynes/cm at 25° C.

PDMS-2—refers to polydimethylsiloxane having a viscosity at 25° C. of 1,000 centistokes a viscosity temperature coefficient of 0.60, a specific gravity at 25° C. of 0.974, a refractive index at 25° C. of 1.4035, a pour point of −50° C., a flash point of 321° C. and a surface tension of 21.3 dynes/cm at 25° C.

The following examples 1 to 14 describe the preparation of liquid dispersions (which do not include metallic pigments) for addition to thermoplastics to produce a metallic effect; Example 15 describes a general method for colour concentrate preparation; Example 16 describes a general method for making preforms; Example 17 provides a general method for producing bottles from preforms; and Example 18 includes the results of assessments on the bottles.

EXAMPLES 1 TO 14—PREPARATION OF LIQUID DISPERSIONS

Liquid dispersion colour concentrates were prepared by dispersing dyes or pigments into PDMS-1 or PDMS-2 using a high speed mixer. Details of the formulations are provided in Tables 1 and 2. Note that all amounts in the tables are weight % (wt %).

TABLE 1

| Ingredient | Example 1 | Example 2 | Example 3 | Example 4 | Example 5 | Example 6 | Example 7 |
|---|---|---|---|---|---|---|---|
| PDMS-1 | 100 | 98.59 | 98.65 | 97.61 | 97.80 | 90.12 | 82.01 |
| Solvent Red 135 | — | 0.88 | 1.21 | 0.80 | — | 4.32 | 7.86 |
| Disperse Yellow 241 | — | 0.31 | — | 1.39 | — | — | — |
| Solvent Green 3 | — | 0.22 | — | 0.20 | — | 4.18 | 7.62 |
| Solvent Red 195 | — | — | 0.08 | — | 2.0 | — | — |
| Solvent Violet 13 | — | — | 0.06 | — | — | — | — |
| Pigment Violet 23 | — | — | — | — | 0.20 | — | — |
| Solvent Blue 104 | — | — | — | — | — | 1.38 | 2.51 |

TABLE 2

| Ingredient | Example 8 | Example 9 | Example 10 | Example 11 | Example 12 | Example 13 | Example 14 |
|---|---|---|---|---|---|---|---|
| PDMS-2 | 100 | 98 | 99 | 94.51 | 98 | 98 | 95.34 |
| Solvent Green 3 | — | — | — | — | — | — | — |
| Solvent Yellow 114 | — | — | — | — | — | — | — |

TABLE 2-continued

| Ingredient | Example 8 | Example 9 | Example 10 | Example 11 | Example 12 | Example 13 | Example 14 |
|---|---|---|---|---|---|---|---|
| Pigment Yellow 147 | — | 1.57 | — | 4.33 | — | — | — |
| Pigment Violet 23 | — | 0.43 | 1 | 1.16 | 0.5 | 0.5 | — |
| Solvent Red 195 | — | — | — | — | 1.50 | — | 0.27 |
| Disperse Orange 47 | — | — | — | — | — | 1.50 | — |
| Solvent Blue 104 | — | — | — | — | — | — | 1.19 |
| Solvent Red 135 | — | — | — | — | — | — | 3.89 |
| Solvent Violet 13 | — | — | — | — | — | — | 0.31 |

The viscosity of formulations in Table 1 ranged from 12,500 centistokes to 16,000 centistokes at 25° C. The viscosity of formulations in Table 2 ranged from 1000 centistokes to 2000 centistokes at 25° C.

EXAMPLES 15 TO 21

Further liquid dispersion colour concentrates were prepared by dispersing dyes or pigments into PDMS-1 using a high speed mixer. Details of the formulations are provided in Table 3. Examples 16 to 19 and 21 include cetyl dimethicone, a surfactant together with fumed silica, added as a rheology modifier.

TABLE 3

| Ingredient | Example 15 | Example 16 | Example 17 | Example 18 | Example 19 | Example 20 | Example 21 |
|---|---|---|---|---|---|---|---|
| PDMS-1 | 100 | 83.75 | 92.45 | 79.25 | 83.75 | 97.61 | 96.51 |
| Cetyl Dimethicone from Basildon Chemicals BC (surfactant) | | 0.75 | 0.30 | 1 | 0.75 | | 0.1 |
| Calcium Carbonate | — | 15 | — | — | — | — | — |
| Fumed Silica | — | 0.50 | 1 | 0.50 | 0.50 | — | 1 |
| Solvent Red 195 | — | — | 6.25 | 16 | — | — | — |
| Solvent Yellow-114 | — | — | — | 3 | — | — | — |
| Carbon Black | — | — | — | 0.25 | — | — | — |
| Solvent Blue 104 | — | — | — | — | 15 | — | — |
| Disperse Yellow 241 | — | — | — | — | — | 1.39 | 1.39 |
| Solvent Red 135 | — | — | — | — | — | 0.80 | 0.80 |
| Solvent Green 3 | — | — | — | — | — | 0.20 | 0.20 |

The initial viscosity of the formulations in Table 3 ranged from 12,500 centistokes to 16,000 centistokes at 25° C.

EXAMPLE 22—ASSESSMENT OF STORAGE STABILITY OF FORMULATIONS OF EXAMPLES 20 AND 21

A Turbiscan technique was used to assess suspension stability (and therefore storage stability) of formulations with a view to providing a means of providing formulations which are stable against sedimentation and/or flocculation over a long period of time (e.g. up to 9 months). The technique uses the relationship between transmitted or back-scattered light with the concentration of dispersed solids in a liquid suspension. The machine uses standard measurement cells that are scanned with a LED light source along a vertical axis of the cell. The transmitted or back scattered light is measured v. height, to give a profile across the cell in order to give an indirect measurement of the solids concentration profile through the height of the sample. By measuring the cell repeatability, data can be built up over time to give an indication of suspension stability, Results for Examples 20 and 21 are provided in FIGS. 1 and 2 respectively.

FIG. 1 shows that the formulation begins to show noticeable sedimentation after 20 days. By 40 days, the product had clearly flocculated and settled significantly. However, as is clear from FIG. 2, the addition of surfactant and rheology modifier significantly reduces flocculation and no sedimentation was observed up to 9 months.

EXAMPLE 23—GENERAL METHOD FOR COLOUR CONCENTRATE PREPARATION 800 g of dried polyethylene terephthalate (PET) polymer pellets (C93 Virgin PET from Equipolymers, dried at 160°

C. for 3 hours) were introduced into a 1 litre container. 2 wt % of the liquid dispersion selected from Examples 1 to 21 was added to the container. A lid was applied to the container and the contents were shaken manually or stirred with a spatula until the polymer pellets were fully coated with dispersion. These steps were repeated for each dispersion of Examples 1 to 21.

EXAMPLE 24—GENERAL METHOD FOR MAKING PREFORMS

A colour concentrate made as described in Example 23 was let down into PET by introducing the concentrate made as described in Example 23 into one feeder and dried PET pellets into a separate feeder of a 160-ton HUSKY (Trade Mark) injection moulding machine fitted with appropriate tooling. In each case, 2 parts by weight (pbw) of concentrate was used per 100 parts of PET.

The injection moulding was conducted at 285° C. Each preform weighed approximately 35 grams and was cylindrical, approximately 130 mm in length with a screw top base. The preforms could be blown into one litre bottles with a petaloid base.

Preforms were made using each of the formulations described in Examples 1 to 21. Between use of each formulation, the moulding machine was fully cleaned and purged of residue from a preceding sample using natural uncoloured polymer. After introduction of a new colour concentrate, a sample was manually extruded from the moulding machine until the new colour was observed in the extrudate. The moulding cycle was then started and, after disposing of the first eight preforms, between six and fourteen preforms were collected and retained for subsequent stretch blow moulding. For consistency, in each case, the same preform moulding method was used.

EXAMPLE 25—GENERAL METHOD FOR MAKING BOTTLES

Preforms made as described in Example 24 were stretch blow moulded, into 1 litre bottles, using a Sidel SB-01 stretch blow moulding machine, with a blowing temperature in the range 105° C. to 120° C.

EXAMPLE 26—ASSESSMENT OF BOTTLES

Bottles blown as described in Example 25 were visually assessed and the results are recorded in Table 4.

TABLE 4

| Liquid dispersion used in bottled manufacture | Colour of bottle | Aesthetic appearance of bottle |
| --- | --- | --- |
| Example 1 | White | Metallic, chrome |
| Example 2 | Gold | Metallic colour |
| Example 3 | Pink | Metallic colour |
| Example 4 | Gold | Metallic colour |
| Example 5 | Pink | Metallic colour |
| Example 6 | Silver | Metallic colour |
| Example 7 | Black | Metallic colour |
| Example 8 | White | Metallic, chrome |
| Example 9 | Red/Green - Red top tone/Green through tone | Metallic colour |
| Example 10 | Purple | Metallic colour |
| Example 11 | Red/Green | Metallic colour |
| Example 12 | Red/Purple | Metallic colour |
| Example 13 | Red/Orange | Metallic colour |
| Example 14 | Silver | Metallic colour |
| Example 15 | White | Metallic, chrome |

TABLE 4-continued

| Liquid dispersion used in bottled manufacture | Colour of bottle | Aesthetic appearance of bottle |
| --- | --- | --- |
| Example 16 | Opaque White | Metallic colour |
| Example 17 | Pink | Metallic colour |
| Example 18 | Red | Metallic colour |
| Example 19 | Blue | Metallic colour |
| Example 20 | Gold | Metallic colour |
| Example 21 | Gold | Metallic colour |

As an alternative to letting down the colour concentrate of Example 23 in PET as described in Example 24, it is preferred (especially for large scale production of preforms) to introduce a liquid dispersion (e.g. as described in Examples 1 to 21) directly at the throat of the injection moulding machine to contact and be mixed with PET pellets. Alternatively, the liquid dispersion may be injected downstream of the feed throat into melted PET.

It should be noted that, in the liquid dispersion, the polydimethylsiloxane (PDMS) is in liquid form and acts as a carrier for the colourant, for example dye. In addition, the PDMS has the effect, upon stretching of the PET containing the PDMS (e.g. as described in Example 25) to produce the metallic-effect described.

As an alternative to production of PET preforms which are stretched to produce bottles, the liquid dispersion may be added to a wide range of polymeric materials which may be melt-processed and subsequently stretched (uniaxially or biaxially) to produce a product. Suitable polymeric materials may comprise polyesters (e.g. PET), polyolefins (e.g. polypropylene), polycarbonates, acrylics and polystyrenes. Preferably, the liquid dispersion (e.g. comprising PDMS and colourant) is incompatible with the polymeric material used since incompatibility optimises production of the metallic effect described.

As an alternative to production of bottles, liquid dispersion as described may be added to polymeric materials used to produce biaxial films, sheets, fibres or other articles which involve stretching of a polymeric material in the production of a product.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of producing a product, the method comprising:
   a step (i)* which comprises contacting a carrier polymer with a thermoplastic polymer;
   a step (i) which follows step (i)* and comprises selecting a mass comprising said thermoplastic polymer which incorporates said carrier polymer, wherein said carrier polymer includes oxygen atoms and silicon atoms in its backbone; and
   a step (ii) which comprises stretching the thermoplastic polymer during production of said product from said mass.

2. A method according to claim 1, wherein said carrier polymer is a polydialkylsiloxane.

3. A method according to claim 1, wherein said carrier polymer includes a repeat unit of formula

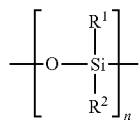

wherein $R^1$ and $R^2$ both represent $C_{1-2}$ un-substituted alkyl moieties.

4. A method according to claim 1, wherein said carrier polymer is polydimethylsiloxane.

5. A method according to claim 1, wherein step (i)* of the method takes place in a melt-processing apparatus and said carrier polymer is dosed into said thermoplastic polymer when said thermoplastic polymer is in a molten state.

6. A method according to claim 5, wherein said thermoplastic polymer is contacted with a formulation which comprises said carrier polymer, wherein said formulation comprises:
(i) said carrier polymer; and
(ii) a colourant;
wherein said formulation is a liquid.

7. A method according to claim 6, wherein said formulation includes 0 wt % of laminar or plate-like pigments; includes 0 wt % of metallic colourant; and includes 0 wt % of pearlescent colourant.

8. A method according to claim 6, wherein at least 95 wt % of the total amount of colourant(s) in said formulation have a maximum dimension which is less than 200 μm.

9. A method according to claim 6, wherein said formulation comprises 80 to 99 wt % of polydimethylsiloxane and 1 to 20 wt % in total of one or more colourants.

10. A method according to claim 6, wherein, in said formulation, the sum of the wt % of all carrier polymers which include a repeat unit of formula

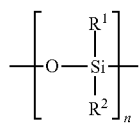

wherein $R^1$ and $R^2$ both represent $C_{1-2}$ un-substituted alkyl moieties and all colourants is at least 95 wt %.

11. A method according to claim 6, wherein, in said formulation, the sum of the wt % of polydimethylsiloxane and all colourants is at least 98 wt %.

12. A method according to claim 1, wherein in step (i)* a mixture is formed comprising carrier polymer and thermoplastic polymer and the mass selected in step (i) includes said mixture, wherein said mass includes at least 0.5 wt % of carrier polymer and at least 95 wt % of thermoplastic polymer and said mass includes 0-2 wt % of colourant(s).

13. A method according to claim 1, wherein, in said mass, the ratio of the wt % of carrier polymer divided by the wt % of thermoplastic polymers is in the range 0.05 to 0.005.

14. A method according to claim 13, wherein said thermoplastic polymer is a polyester.

15. A method according to claim 1, wherein a precursor of the product is made and isolated prior to step (ii) of the method, wherein said precursor is a preform for a bottle.

16. A method according to claim 1, wherein step (ii) comprises stretching the thermoplastic polymer in at least two directions.

17. A method according to claim 1, which comprises production of a bottle from a preform by contacting thermoplastic polymer with a carrier polymer; injection moulding a mixture comprising the thermoplastic polymer and carrier polymer to produce a preform; and subsequently stretch blow-moulding the preform to produce a product in the form of a bottle.

18. A method of producing a product, the method comprising:
(i) contacting a formulation with a polyester in a melt-processing apparatus to produce a mass comprising said polyester incorporating said formulation, wherein said formulation is dosed into said polyester in a molten state, wherein said formulation is a liquid and comprises a carrier polymer comprising polydimethylsiloxane and a colourant, wherein said formulation includes 0 wt % of laminar or plate-like pigments, includes 0 wt % of metallic colourant and includes 0 wt % of pearlescent colourant, wherein the sum of the wt % of all carrier polymers in said formulation which include a repeat unit of formula

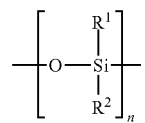

in which $R^1$ and $R^2$ both represent $C_{1-2}$ un-substituted alkyl moieties and all colourants is at least 95 wt %, and wherein said formulation comprises 80 to 99 wt % of the polydimethylsiloxane and 1 to 20 wt % in total of one or more colourants;
(ii) producing said mass to include at least 0.5 wt % of carrier polymer and at least 95 wt % of thermoplastic polymer and 0-2 wt % of colourant(s) and wherein, in said mass, the ratio of the wt % of carrier polymer divided by the wt % of thermoplastic polymers is in the range 0.05 to 0.005; and
(iii) stretching the thermoplastic polymer in at least two directions during production of said product from said mass;
wherein a precursor of the product comprises a preform for a bottle which is made and isolated prior to step (iii).

* * * * *